United States Patent [19]

Okada et al.

[11] Patent Number: 4,758,905
[45] Date of Patent: Jul. 19, 1988

[54] IMAGE PICKUP APPARATUS WITH A ROTARY SHUTTER

[75] Inventors: Fujio Okada; Motohiko Horio; Naoki Kobayashi; Kouji Kaneko, all of Saitama; Akira Muramatsu, Kanagawa, all of Japan

[73] Assignees: Fuji Photo Film Co., Ltd., Kanagawa; Fuji Photo Optical Co., Ltd., Saitama, both of Japan

[21] Appl. No.: 832,089

[22] Filed: Feb. 24, 1986

[30] Foreign Application Priority Data

Feb. 22, 1985 [JP] Japan .................................. 60-34180
Feb. 28, 1985 [JP] Japan .................................. 60-37712

[51] Int. Cl.$^4$ ............................................ H04N 5/781
[52] U.S. Cl. ..................................... 360/35.1; 360/60;
                                   360/33.1; 358/335; 358/906; 358/909
[58] Field of Search ........... 358/906, 909, 335, 213.13;
                                              360/60, 35.1, 33.1

[56] References Cited

U.S. PATENT DOCUMENTS

| 4,420,773 | 12/1983 | Toyoda | 360/35.1 |
| 4,471,388 | 9/1984 | Dischert | 358/906 |
| 4,573,087 | 2/1986 | Tezuka | 360/60 |

*Primary Examiner*—Alan Faber
*Attorney, Agent, or Firm*—Young & Thompson

[57] ABSTRACT

An image pickup apparatus using an image sensor is provided with a rotary shutter that controls the amount of time the image-forming light strikes the image sensor. A synchronism detector is provided to detect the phase difference between the rotation of the rotary shutter and the scanning of the image sensor by comparing the phase signals produced according to the speed of rotation of the rotary shutter and vertical synchronizing signals periodically produced as well as scanning signals for scanning the image sensor. When there is no phase difference between the two signals, the synchronism detector provides an operation signal which causes a switching circuit to be conductive, so as to permit an image recorder to record images. On the other hand, if there is a phase difference, the synchronism detector provides no operation signal and the switching circuit is rendered non-conductive so as to prevent the image recorder from recording images.

11 Claims, 6 Drawing Sheets

IMAGE PICKUP APPARATUS WITH A ROTARY SHUTTER

BACKGROUND OF THE INVENTION

The present invention relates to an image pickup apparatus of the type having a rotary shutter which controls the amount of time the image forming light strikes an image element.

Generally, electronic still picture cameras using a still video floppy disk as an image recording medium have in their image pickup system a solid state image sensor consisting of a large number of small photoelectric conversion elements arranged in a matrix, for example devices known as CCD arrays, MOS arrays and the like. The use of such solid state image sensors contributes to the low cost of manufacturing electronic still picture cameras and the compactness of cameras for convenience of carrying.

The above-mentioned solid state image sensor is driven by scanning signals to transfer to a shift register image information in the form of signal charges from the photoelectric conversion elements in the arranged order. When the signal charges are transferred to the shift register from all the photoelectric conversion elements, an operation for taking a single still picture is completed. This operation can be successively repeated by successively driving the solid state image sensor. However, because the electronic still camera generally cooperates with shutter means, it is usual to use, as image information, photoelectric output signals retrieved from the image sensor in a time period defined by the shutter means, for example approximately 1/60 to 1/1000 sec., in order to record one frame of still picture image.

It has been attempted to use as a shutter incorporated in the above-described electronic still camera a rotary shutter which is adapted to rotate always in the path of image forming light.

The rotary shutter is driven by means of a servodriving system to rotate at a constant speed in synchronism with scanning the image sensor. That is to say, the rotary shutter, after having reached a constant speed of rotation, begins to open simultaneously with every vertical synchronizing signal supplied to the image sensor. Consequently, it suffices to start an image pickup operation immediately in response to a first vertical synchronizing supplied to the image sensor after the operation of shutter initiating means. In other words, it is unnecessary to synchronize opening the rotary shutter with the vertical synchronizing signal every image pickup operation in order to achieve a favorable operation. In addition, the provision of the rotary shutter adapted to continuously rotate contributes to a drastic reduction of time intervals at which consecutive still images are recorded.

One of the problems with which the use of the rotary shutter is confronted is that the synchronized rotation of the rotary shutter is not immediate at its beginning, because of difference of starting characteristic between a motor for the rotary shutter and a pulse generator which provides the vertical synchronizing signals for scanning. When the rotary shutter rotates under asynchronized conditions, the rotary shutter often either fully or partly blocks the image sensor which is being scanned. Therefore, when an image pickup operation is conducted under such asynchronized conditions, no image information signal or an insufficient image information signal is retrieved.

In the case of the electronic still picture cameras of the type having an electronic viewfinder for displaying images on a CRT or LC screen, when the rotary shutter is in an asynchronized condition, there appears an undesirable image of the whole or a part of the rotary shutter on the finder screen. Such undesirable or confusing image mars the otherwise perfect viewfinder image and often misinforms the camera operator that the camera is broken.

Another problem is the current consumption of batteries. Before the rotary shutter reaches a constant speed of rotation, if insufficient image information signals are retrieved, undesirable images appear on the screen of the electronic viewfinder. It is therefore undesirable to supply power to circuit units of an image recording system and an electronic viewfinder and to keep them active.

OBJECTS OF THE INVENTION

A principal object of the present invention is, therefore, to provide an image pickup apparatus with a rotary shutter which avoids recording imperfect images before the rotary shutter reaches a constant speed of rotation.

Another object of the present invention is to provide an image pickup apparatus which is prevented from recording imperfect images when the rotary shutter is rotating in asynchronism with the scanning of the image sensor.

Still another object of the present invention is to provide an image pickup apparatus in which an image recording device is prevented from operating so as to avoid recording imperfect images.

A further object of the present invention is to provide an image pickup apparatus in which current consumption of the power sources can be prevented when the rotary shutter is rotating in asynchronism with the scanning of the image sensor.

SUMMARY OF THE INVENTION

Briefly, the apparatus in accordance with the present invention comprises pulse signal generating means for generating signals whose pulse repetition rate is proportional to the speed of rotation of the rotary shutter, detecting means for detecting the occurrence of the phase difference between vertical synchronizing signals for scanning the image sensor and the above-mentioned signal to provide an operation signal when there is no phase difference, and means which is actuated by the operation signal to permit the transfer of the image information signals from the image sensor to an image forming section such as an image recording device and an electronic viewfinder.

In the illustrated embodiments, a switching circuit is incorporated in an electronic still camera with a rotary shutter and adapted to be rendered non-conductive if the rotary shutter rotates in asynchronism with the scanning of the image sensor, that is, no operation signal is produced, so as to prevent the camera from recording and/or displaying images. The switching circuit is connected in series between the magnetic image recorder and/or an electronic viewfinder and either the image sensor or a power source for at least the magnetic image recorder and the electronic viewfinder.

Preferably, the operation signal is produced when the rotary shutter rotates in synchronism with the scanning of the image sensor for a specified time in order to avoid the detection of temporary synchronism between the rotation of the rotary shutter and the scanning of the image sensor.

According to the present invention, since the electronic still camera is prevented from recording and/or displaying images when the rotary shutter rotates in asynchronism with the scanning of the image sensor, especially before the rotary shutter reaches a constant speed of rotation just after the camera operation is initiated, the recording of imperfect images or undesirable confusing images on a magnetic recording medium such as a floppy disk is avoided, as well as the waste of the same. Also avoided is the display of confusing images which often misinform the camera operator that the camera is broken, and also the waste of the current of the batteries. These features are useful in electronic still cameras for personal use.

BRIEF DESCRIPTION OF THE DRAWINGS

The nature of this invention, as well as other objects and advantages thereof, will be readily apparent from a consideration of the following description relating to the accompanying drawings, in which like reference numerals designate the same or similar parts throughout the figures thereof, and wherein.

DETAILED DESCRIPTION OF THE INVENTION

Figure 1:
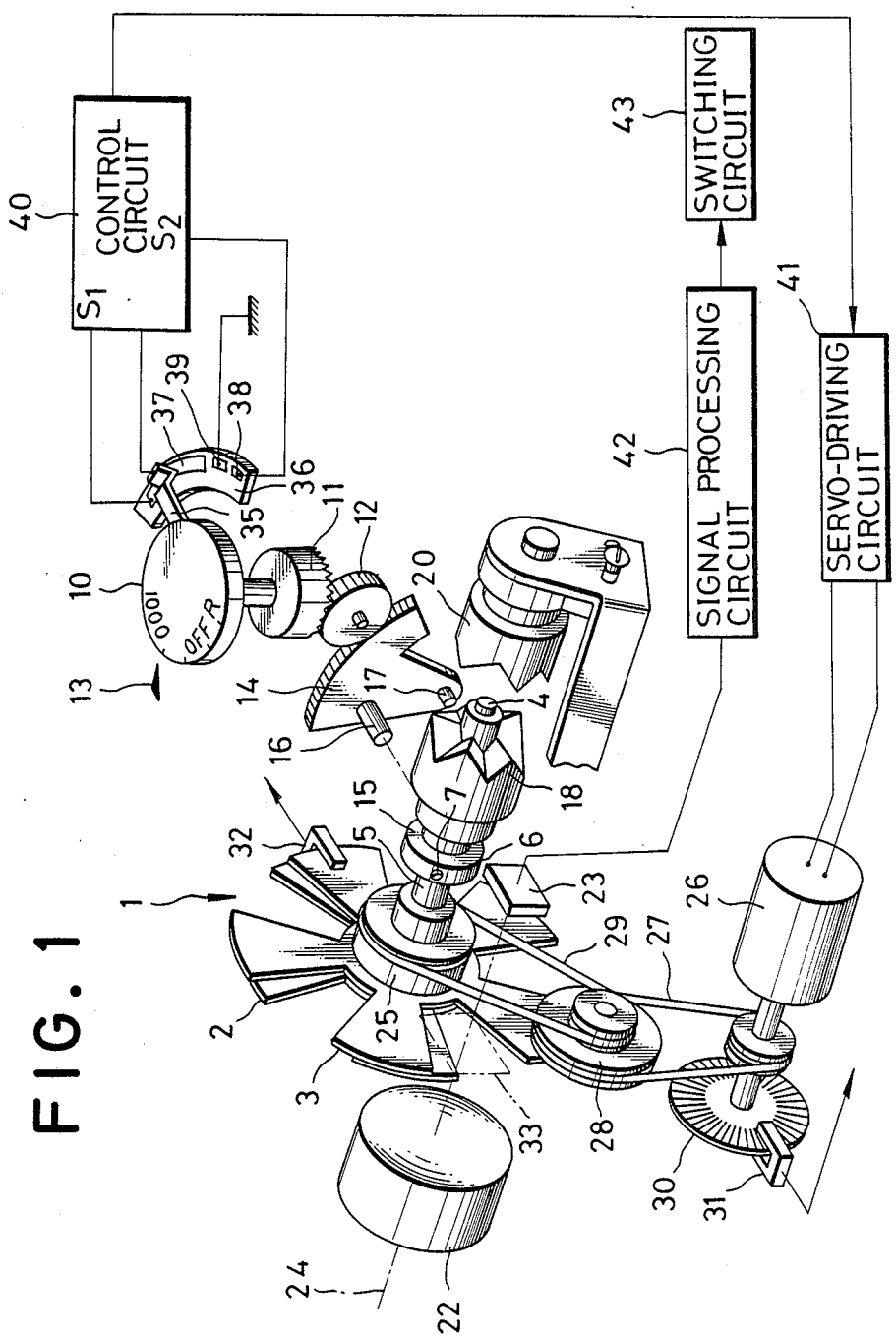
FIG. 1 is a schematic, exploded perspective view of a rotary shutter which is used in an electronic still camera in accordance with the present invention.

Referring now to FIG. 1, there is shown a rotary shutter used in the electronic still camera according to a preferred embodiment of the present invention.

The rotary shutter 1 comprises front and rear shutter blades 2, 3, each being provided with a plurality, for example five in this embodiment, of openings defined by sector blades at regular intervals. These shutter blades 2, 3 are mounted on shafts 4, 5, respectively for rotary displacement relative to each other and for rotary movement as a unit. For the relative displacement, the front shutter blade 2 is fixedly attached to the inner shaft 4 which is rotatably supported in the hollow outer shaft 5 for the rear shutter blade 3, these shafts being formed with cam slots (not shown) crossing each other, for example an axially straight cam slot for one shaft and a curved cam slot for the other. On the outer shaft 5 a control ring 6 provided with an annular groove 15 on its outer periphery is mounted for axial movement. The control ring 6 has a pin 7 fixedly attached thereto and inwardly extending therefrom, so as to enter into the cam slots at their intersection. The annular groove 15 of the control ring 15 is engaged by a pin 16 which is mounted on and extends from a sector gear 14 supported on a shaft 17 for pivotal movement. The control ring 6 can thus be moved axially as a result of the pivotal movement of the sector gear 14, causing the relative displacement between the inner and outer shafts 4, 5 and hence the front and rear shutter blades 2, 3, thereby varying the size of each opening therebetween.

The pivotal movement of the sector gear 14 is effected by rotating a mode selection dial 10 which has a bevel gear 11 connected to the sector gear 14 through an idle gear 12. Because the size of the opening defined by edges of the adjacent sector blades of the shutter blades 2, 3 correspond to exposure times, the dial 10 is also used as a shutter speed setting dial when it is in its single shot selecting position.

At the rear end of the control ring 6 there is a clutch gear 18 secured thereto having the same number of teeth as the sector blades of each shutter blade 2, 3. Aligned with gear 18 is another clutch gear 20 having the same number of teeth which is secured to a constructional member of a camera. These clutch gears 18, 20 can be engaged with each other when the control ring 6 is moved to its rearmost position.

When selecting a continuous mode in the electronic still camera by turning the mode selection dial 10 to set the index mark "R" to an indication 13, the control ring 6 is moved to its rearmost position, causing the relative movement between the front and rear shutter blades 2, 3 fully to open the openings between the respective adjacent sector blades as a result of bringing the clutch gears 18, 20 into full engagement with each other. Consequently, there is created between the control ring 6 and the shutter blades 2, 3 an absolutely fixed relationship by which the rotary shutter 1 permits the entry of light that has passed through an aperture 33 into an image sensor 23 along the optical axis 24 of a taking lens 22.

The rotary shutter 1 is driven by means of a motor 26, the rotary shaft of which is connected to a pulley 25 fixedly attached to the rear shutter blade 3 through a transmission mechanism comprising a differential pulley 28 and belts 27, 29. Mounted on the motor shaft at its end is a slit disk 30 provided with a large number of radially extending slits which are detected by means of a photointerrupter 31 serving as a frequency detector. The frequency detector 31 is adapted to produce a pulse having a certain duration every detection of the slit in order to monitor the speed of rotation of the motor 26. On the other hand, there is a phase detector 32 which is interrupted by the shutter blades 2, 3 in order to monitor the phase of rotation of the rotary shutter 1. Ths phase detector 32 comprises, for example, a photointerrupter which is adapted to produce a pulse having a certain time duration by being interrupted by the rear edge of each sector blade of the rear shutter blade 3 rotating in the counterclockwise direction, that is to say, at the moment the rotary shutter 1 begins to open the aperture 33.

The mode selection dial 10 is provided with a resilient arm 35 which at its end can slide on conductive contacts 37–39 printed on a base plate 36. When turning the mode selection dial 10 to set the electronic still camera to a one-shot mode and then to select a desired shutter speed, the conductive arm 35 is brought into contact with the conductive contact 37, causing an input terminal S1 of a control circuit 40 to be turned ON. As a result, a servo-driving circuit 41 is actuated to drive the motor 26. As previously described, the motor 26 is controlled to rotate at a constant speed with the aid of the frequency detector 31.

When setting the electronic still camera to its continuous mode by turning the mode selection dial 10 to set the index mark "R" to the indication 13, the conductive arm 35 is brought into contact with the conductive contact 38 to invert the control circuit 40, causing the input terminal S1 to be OFF and the input terminal S2 to be ON. Consequently, the driving circuit 41 is shut down, thereby stopping the motor 26.

The mode selection dial 10 is turned to set the index mark "OFF" to the indication 13, the conductive arm 35 being thus brought into contact with the conductive contact 29 to cause both of the input terminals S1, S2 of the control circuit 40 being OFF, while the rotary shutter 1 is stopped with the openings fully opened.

During the time the rotary shutter 1 is opening the aperture 33, serial output signals as image information are retrieved from individual radiation-sensing areas of the image sensor 23 on which the image of an object is focused by the taking lens 22 and transferred to a signal processing circuit 42 in order to provide video signals in a suitable form, for example NTSC format, for reproducing the image on a CRT screen.

Figure 2:
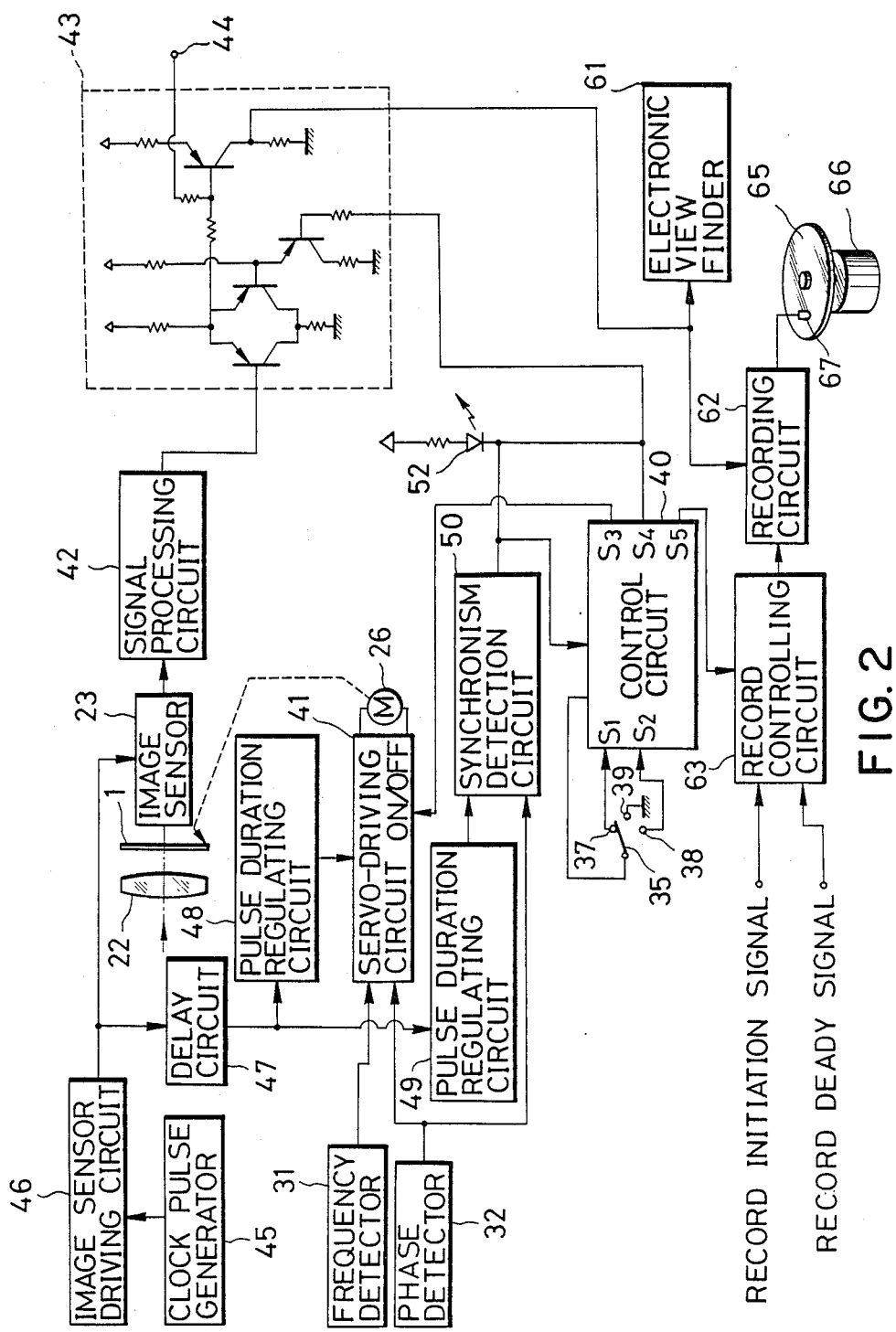
FIG. 2 is a block diagram, showing in detail the construction of a control circuit constituting an embodiment of the electronic camera according to the present invention.

FIG. 2 shows a control circuit which is incorporated into the electronic still camera according to one desirable embodiment of the present invention.

The whole control circuit is reset to be operable by turning ON a power supply switch (not shown). A clock pulse generator 45 is actuated to provide a clock pulse whose repetition rate is constant. In response to the clock pulses, a drive circuit 46 provides scanning signals for scanning the image sensor 23. As is well known, a vertical synchronizing signal is periodically provided at a constant repetition rate in the scanning signals. At the same time, the servo-driving circuit 41 is also actuated to start the motor 26, and hence the rotary shutter 1 is rotated to permit the image forming light passing through the taking lens 22 to travel to the image sensor 23. Consequently, output signals are retrieved from the individual photoelectric conversion elements of the image sensor 23 in response to the scan signal.

The frequency detector 31 can, as previously described, produce a series of pulses whose repetition rate corresponds to the speed of rotation of the motor 26 and which in turn is transmitted to the servo-driving circuit 41 as a feed-back signal for maintaining the speed of rotation of the motor 26 constant. On the other hand, the phase detector 32 produces a series of pulses each of which has a certain duration and whose repetition rate corresponds to the speed of rotation of the rotary shutter 1. The series of pulses, which serves as a phase signal of the rotating shutter 1, is transmitted to a synchronism-detection circuit 50.

The above-described vertical synchronizing signal is transmitted to the servo-driving circuit 41 through a delay circuit 47 and a duration-regulating circuit 48 as well as to the synchronism-detection circuit 50 through a pulse-duration-regulating circuit 49 similar to the circuit 48. The delay circuit 47 functions to delay the vertical synchronizing signals a certain time in order to compensate the difference between the actual phase of rotation of the rotary shutter 1 and the occurrence of phase pulses, from the phase detector 32, thereby timing the interval between the occurrence of a vertical synchronizing signal and the opening of the rotary shutter 1. On the other hand, the pulse duration regulating circuit 48 is used to keep the duration of the pulses of the vertical synchronizing signals constant.

The vertical synchronizing signals are transmitted to the synchronism-detection circuit 50 through the pulse duration regulating circuit 49 which is used to reduce pulse duration in order to improve the accuracy with which the synchronism between the rotation of the rotary shutter 1 and the scanning of the image sensor 23 is detected in the synchronism-detection circuit 50, as will be described in detail later. The synchronism-detection circuit 50, in which any phase difference between the two signals is detected, is adapted to provide a signal that is "HIGH" when there is no phase difference and "LOW" when there is a phase difference. The signal from the synchronism-detection circuit 50 is impressed on the cathode line of an LED 52, which is caused to emit light only when the impressed signal is "LOW".

Figure 3:
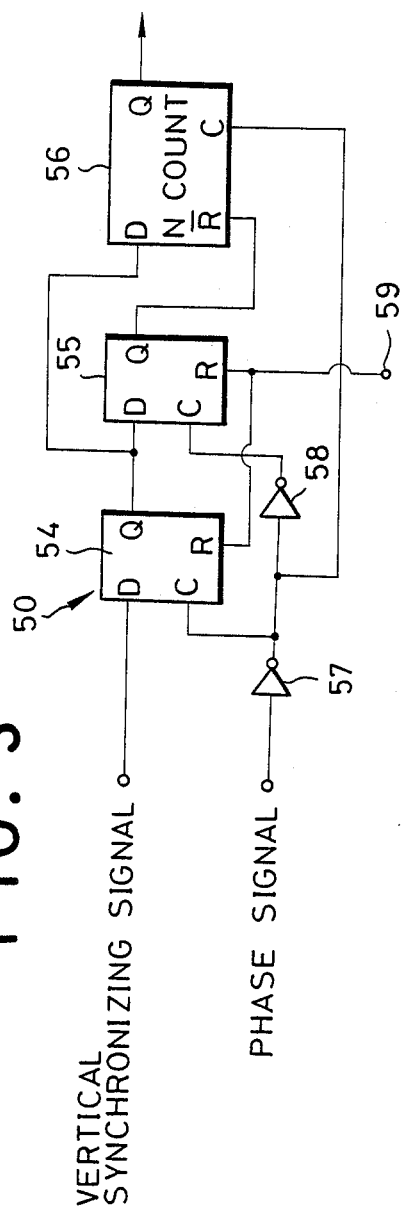
FIG. 3 is a block diagram, showing in detail the construction of a switching circuit of the control circuit of FIG. 2.
Figure 4:
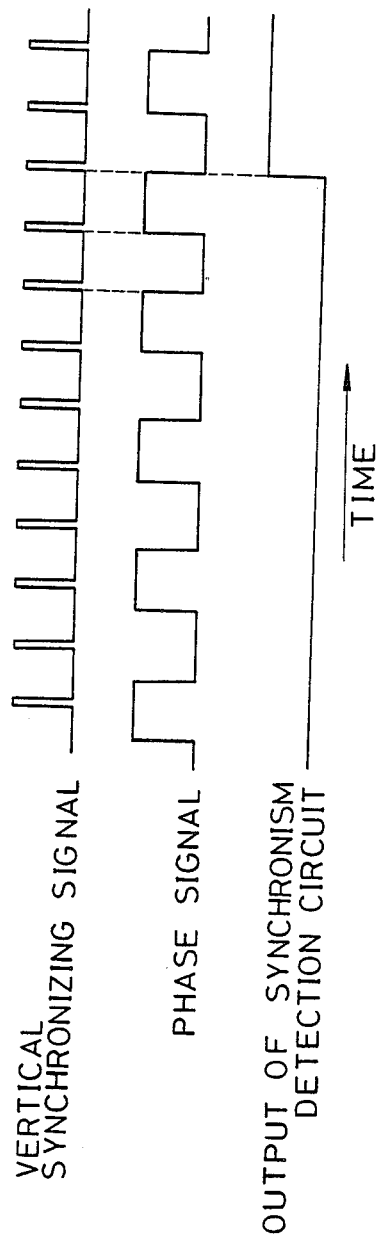
FIG. 4 is a time-sequence diagram showing the wave forms of the synchronism detection circuit of FIG. 2.

As shown by way of example in FIG. 3, the synchronism-detection circuit 50 comprises D-flip-flop circuits 54, 55, N-count D-flip-flop circuit 56 and inverter circuits 57, 58, each component circuit being well known in the art. According to the synchronism-detection circuit 50 in which it is determined whether there are vertical synchronization signals at each moment of the rise and fall of each phase pulse, as shown in FIG. 4, a signal indicating the synchronized rotation of the rotary shutter 1 (which is referred to as a synchronization signal hereinafter) is provided when the counted value of the D-flip-flop 56 reaches the predetermined number "N+1" (N being a positive integer), that is, when there is no phase difference between the consecutive vertical synchronization signals of the number "N+1" and the corresponding number of the rise and fall of the consecutive phase signals. Of course, whenever there occurs a phase difference before the counted value of the D-flip-flop circuit 56 reaches the predetermined number "N+1", a reset signal is impressed on an R terminal of the D-flip-flop circuit 56, cancelling the value thereof counted up to that time and resetting it to "0" (zero). A reset terminal 59 shown in FIG. 4 is provided to receive a reset signal for resetting the synchronism-detection circuit 50 to its initial condition when the proper supply switch is turned ON.

As described above, because the detection of synchronism between the rotation of the rotary shutter 1 and the scanning of the image sensor 23 is based on whether or not there is a phase difference between a plurality of consecutive vertical synchronizing signals for the image sensor 23 and the corresponding number of the rise and fall of the consecutive phase signals form the phase detector 32, it is ensured that an erroneous synchronism detection based on an accidental simultaneity between one or a few vertical synchronizing signals and the rise and fall of the phase signals will be avoided. In the synchronism-detection circuit 50 shown in FIG. 3, the circuit 50 can operate in the same manner as in the case described above when impressing the vertical synchronizing signals on the C terminal (clock terminal) and the phase signals on the D terminal of each D-Flip-flop circuit 54, 55, 56.

The output signal from the synchronism detection circuit 50 is directed to the control circuit 40 as previously described. This control circuit 40 is adapted to provide "HIGH" signals at its output terminals S4, S5, respectively, in response to the impression of a "HIGH" signal thereon from the synchronism-detection circuit 50 when the input terminal S1 is kept turned ON. As a result of the presence of a "HIGH" signal at the output terminal S4, the switching circuit 43 is rendered conductive, thereby transmitting video signals from the signal processing circuit 42 to an electronic viewfinder 61 and a recording circuit 62.

On the other hand, when the output terminal S2 is kept turned ON, the output signal is caused to be "LOW" at the terminal S3 and "HIGH" at the terminals S4, S5, independently of the level of the signal from the circuit 50. A terminal 44 of the switching circuit can be used for, for example, a composite synchronizing signal.

A recording control circuit 63, which is rendered operable with "HIGH" signals applied from the terminal S5 of the control circuit 40, is actuated by both a ready signal for recording and a record initiation signal. The ready signal can be provided as a result of the disposition of the still video floppy disk 65 in its proper position, the fixed speed of rotation of a spindle motor 66, for example 3600 RPM, at which the still video floppy disk is rotated, the movement of a magnetic head 67 for recording to its proper access position or the like; on the other hand, the recording initiation signal can be provided as a result of the actuation of a shutter button.

Figure 5:
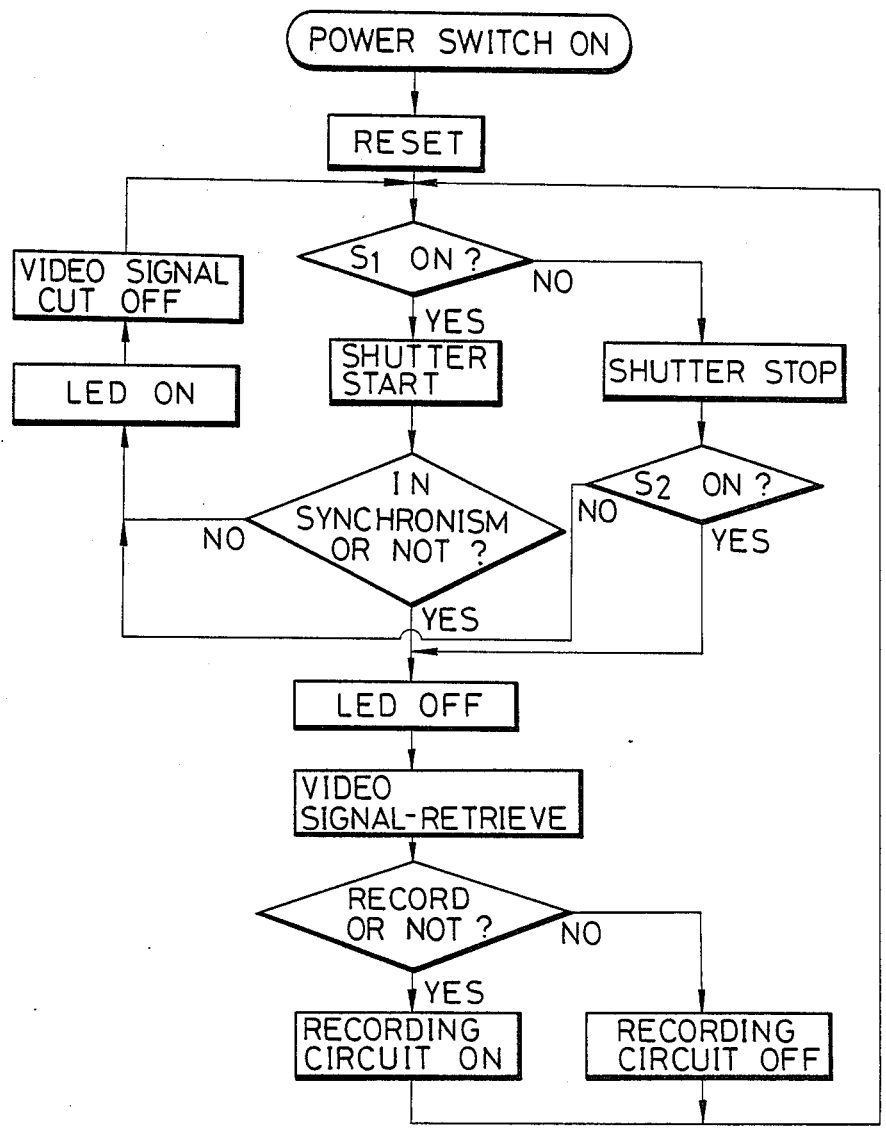
FIG. 5 is a flow chart showing the sequential operation of the electronic still camera according to the present invention.

Referring now to FIG. 5, showing a flow chart of sequential operation of the electronic still camera described above, at first the power source switch is turned on to reset whole circuit units to their initial condition. When the mode selection dial 10 is operated to select the single shot mode and a desirable shutter speed, the conductive arm 35 is brought into contact wiht the conductive contact 37 to cause the input terminal S1 of the control circuit 40 to be ON, and simultaneously the rotary shutter 1 starts to rotate. Consequently, the phase detector 32 and frequency detector 31 produce respectively series of pulse signals whose interval is gradually decreased at the beginning of rotation of the rotary shutter 1 owing to the inertia thereof, while whose time duration is constant, as best seen in FIG. 4. On the other hand, the image sensor deriving circuit 56 can immediately become stable to provide vertical synchronizing signals at constant intervals. The synchronizing-detection circuit 50, therefore, detects whether there is a phase difference. Based on this detection, the output signal of the synchronism-detection circuit 50 is rendered "LOW" thereby causing the LED 52 to emit light to indicate that the rotary shutter 1 is asynchronized.

Simultaneously, under this condition, the output signal at the terminal S4 of the control circuit 40 is also rendered "LOW", and the switching circuit 40 is turned OFF, so as to cut off the transfer of the video signals from the signal processing circuit 42 to electronic viewfinder 61 and the recording circuit 62. Consequently, there is no image displayed on the screen of the viewfinder 61. The recordation of the incomplete or undesirable image on the still video floppy disk 65 is avoided, even if the shutter button is actuated.

When, after the rotary shutter 1 has reached a constant speed of rotation, the rotary shutter 1 is synchronized in rotation with the provision of the vertical synchronizing signals, the output signal of the synchronism-detection circuit 50 is rendered "HIGH", the switching circuit 42 is turned ON and the LED 52 is turned OFF. As a result, the video signals can be transferred from the signal processing circuit 42 to the electronic viewfinder 61 and the recording circuit 62 simultaneously. At the same time, since the recording control circuit 63 is rendered operable, the electronic still camera is ready for recording. Therefore, when both the ready signal and the record initiation signal are impressed on the recording control circuit 63, the recording circuit 62 is caused to record the same image as is displayed on the screen of the electronic viewfinder 61, on the still video floppy disk 65, by means of a magnetic recording head 67. It should be noted that, in a single-shot mode, since the output signal of the synchronism detection circuit 50 is kept "HIGH" as long as the rotary shutter 1 is kept at a constant speed of rotation, a plurality of, for example five at a maximum in this embodiment, images can be consecutively recorded every one revolution of the rotary shutter 1 by keeping the shutter button depressed.

In the continuous mode, which is established by setting the "R" mark on the mode selection dial 10 to the indication 13, the rotary shutter 1 is stopped with its openings fully opened. When the input terminal S2 of the control circuit 40 is rendered ON, the output signals at the terminal S4, S5 of the control circuit 40 are rendered "HIGH", respectively, whereby the switching circuit 40 is turned on, but the LED 52 is not turned on. Consequently, the video signals are transmitted to the electronic viewfinder 61 and the recording circuit 62. Simultaneously, the recording control circuit 63 becomes operable, and the electronic still camera is ready for image recording.

This continuous mode makes it possible not only to use the electronic still camera as a TV camera but also to use the same in combination with a VTR for continuously recording images or as a monitor for the VTR.

When setting the "OFF" mark on the mode selection dial 10 to the indication 13, the output signal of the control circuit 40 is rendered "HIGH" at the terminal S3 and "LOW" at each of the terminals S4, S5, whereby the servo-driving circuit 41 and the switching circuit 42 are shut down, and the LED 52 is turned on to emit light. It is possible to utilize the mode selection switch 10 as a power supply switch in such a way as to stop the operation of whole circuit units by setting the "OFF" mark on the mode selection dial 10 to the indication 13.

Figure 6:
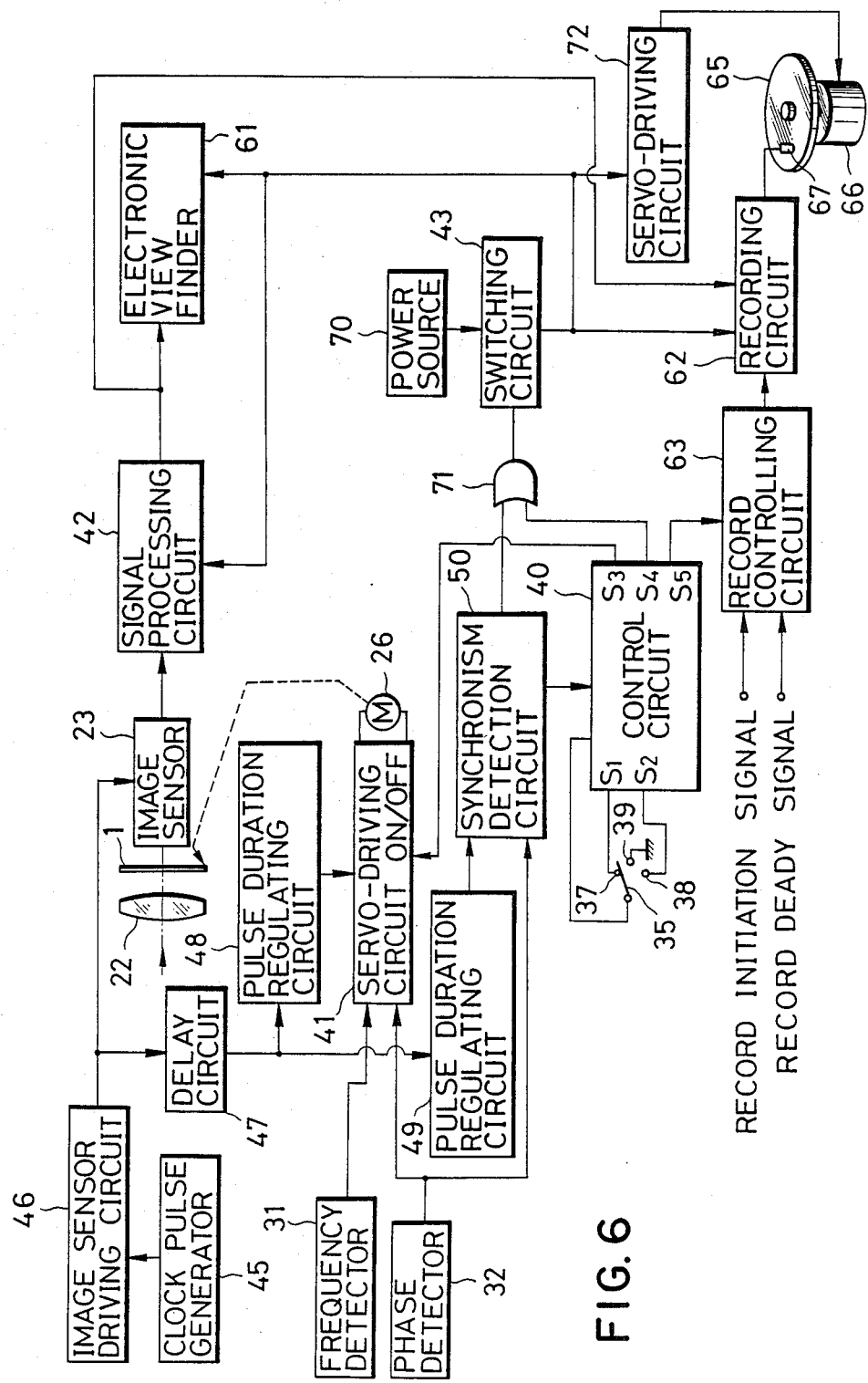
FIG. 6 is a block diagram similar to FIG. 2, showing in detail the construction of a control circuit constituting another embodiment of the electronic camera according to the present invention.

Referring now to FIG. 6, there is shown a control circuit for use with an electronic still camera according to another preferred embodiment of the present invention, in which like reference numbers designate similar parts as in the control circuit of FIG. 2. The detailed description thereof can accordingly be omitted.

In this control circuit, there is a special power supply 70 which supplies operating voltage to the signal processing circuit 42, the electronic viewfinder 61, the recording circuit 62 and a servo-driving circuit 72 for the servo-motor 66 through the switching circuit 43. The switching circuit 43 is controlled to turn on and off of means of an OR circuit 71 on which the output signals of the synchronism-detection circuit 50 and the control circuit 40 at its output terminal S4 are impressed. The OR circuit 71, when either one of the signals impressed thereon is rendered "HIGH", causes the switching circuit 43 to be conductive, thereby allowing the supply of operating voltage to the above-mentioned parts 42, 61, 62, 72. Therefore, the above-mentioned parts, namely, the signal processing circuit 42, the electronic viewfinder, the recording circuit 61 and the servo-driving circuit 72, are caused to be operable or to operate only when the rotary shutter 1 is brought into synchronism with the provision of vertical synchronizing signals in the single-shot mode and when the electronic still camera is set to the continuous mode.

Figure 7:
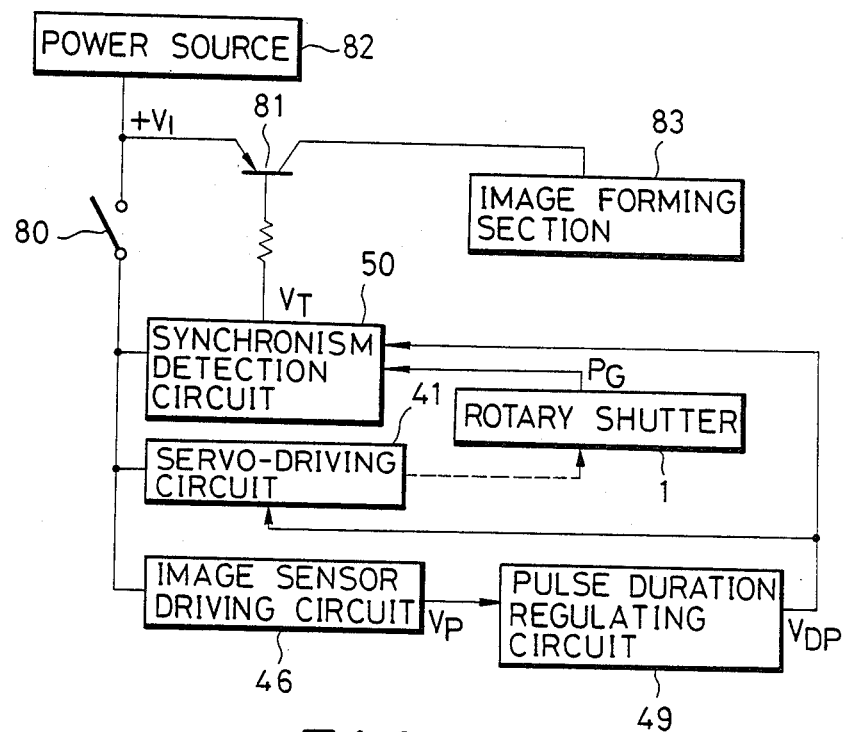
FIG. 7 is a block diagram, showing the construction of a control circuit constituting still another embodiment of the electronic camera according to the present invention.
Figure 8:
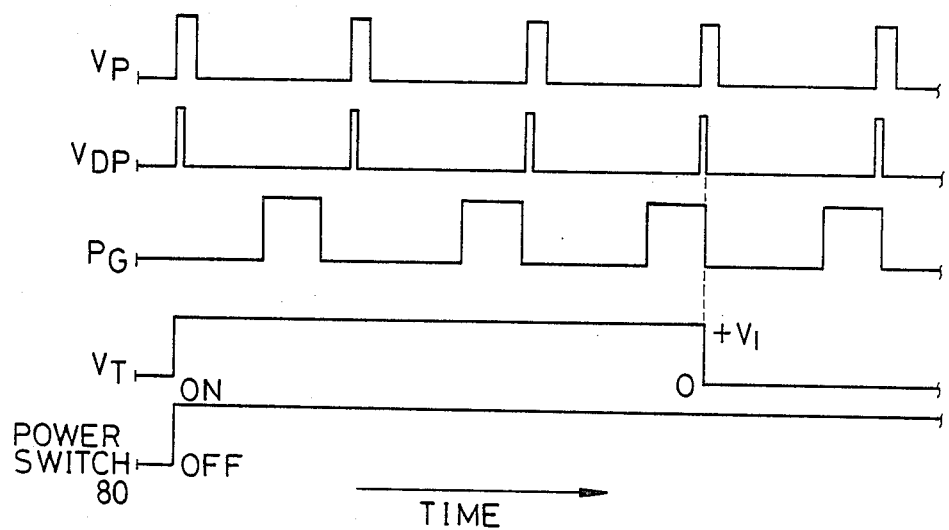
FIG. 8 is a time-sequence diagram showing the wave forms at various locations in the control circuit of FIG. 7.

FIG. 7 shows a control circuit for use with an electronic still camera according to still another embodiment of the present invention in which like reference numerals designate like parts as in the previous embodiments shown in FIGS. 2 and 6, thereby to avoid the repetition of detailed description thereof.

In this control circuit, there are a switching transistor 81 and a power source 82 which can supply operating voltage to whole circuit units.

Upon turning on a main power switch 80, the synchronism-detection circuit 50, the servo-driving circuit 41 and the image sensor driving circuit 46 are caused to operate at once by the supply of operating voltage for the power source 82. Vertical synchronizing signals Vp whose repetition rate is constant are produced for the image sensor driving circuit 46 as well as scanning signals for the image sensor. Each vertical synchronizing signal Vp is transformed by the time duration regulating circuit 49 into a pulse signal $V_{DP}$ having a shortened duration which in turn is transmitted to both of the servo-driving circuit 41 and the synchronism-detection circuit 50, as shown in FIG. 4.

Upon the actuation of the servo-driving circuit 41, the rotary shutter 1 is started to rotate, whereby there are provided a series of phase signals $P_G$ whose repetition is not constant at the beginning of rotation of the rotary shutter 1, as shown in FIG. 4. Therefore, there is a phase difference between the phase signals $P_G$ and the vertical synchronizing signals $V_{DP}$. Under this condition, the output $V_T$ of the synchronism-detection circuit 50 is cause to attain a high level "+V", and so the switching transistor 81 is kept non-conductive. As a result of this, there is no operating voltage supplied to an image-forming section 83 comprising a signal processing circuit, electronic viewfinder unit, recording circuit and the like each of which is similar to that in the previously described embodiments.

The repetition rate of the phase signals $P_G$ is gradually reduced with the speed of rotation of the rotary shutter 1. When the rotary shutter 1 reaches a constant speed of rotation, there is no longer a phase difference between the signals $P_G$ and $V_{DP}$, which means the rotary shutter 1 is rotating i synchronism with the vertical synchronizing signals. At this time, the output $V_T$ of the synchronism-detection circuit 50 is caused to attain "zero level (0)", causing the switching transistor 81 to be conductive. As a result, operating voltage is impressed on the image forming section 83, thereby rendering the same operable. It is possible to modify the synchronism detection circuit 50 to make the decision of synchronism between the rotation of the rotary shutter 1 and the vertical synchronizing signals $V_{DP}$ based on whether there is a phase difference between a plurality of consecutive vertical synchronizing signals $V_{DT}$ and either the rise or the fall of the consecutive phase signals $P_G$ in order to avoid an accidental simultaneity between the two signals $V_{DT}$, $P_G$.

It will be appreciated that various modifications and changes of the preferred embodiments, some of which have been described above, may be made without departing from the scope of this invention as defined in the accompanying claims.

What is claimed is:

1. In an image pickup apparatus with a rotary shutter having sector blades disposed in the path of image-forming light traveling to an image-sensing means to define the amount of time the image-forming light strikes the image-sensing means, and means to scan said image-sensing means with scanning signals including a periodic vertical synchronizing signal to provide photoelectric output signals as image information which in turn are transferred to an image-forming means; the improvement comprising:

means for generating pulse signals representing the starting of opening of said rotary shutter whose pulse repetition rate changes correspondingly to the speed of rotation of said rotary shutter;

means for detecting the occurrence of a phase difference between said vertical synchronizing signals and said pulse signals, said detecting means providing an operation signal when there is no said phase difference; and switching means actuated by said operation signal from said detection means for permitting said image-forming means to form images based on said photoelectric output signal from said image-sensing means.

2. An apparatus as defined in claim 1, wherein said switching means is connected in series between said image-sensing means and image-forming means.

3. An apparatus as defined in claim 1, wherein said switching means is connected in series between a power source for supplying operating voltage to at least said image-forming means, and said image-forming means.

4. An apparatus as defined in claim 1, further comprising means for indicating that there is a said phase difference.

5. An apparatus as defined in claim 1, wherein said detecting means is adapted to provide said operation signal only when there is no said phase difference over a plurality of consecutive said vertical synchronizing signals.

6. An apparatus as defined in claim 5, said signal generating means comprising a photointerrupter for detecting said sector blades of said rotary shutter to generate a said pulse signal whose pulse duration is constant.

7. An apparatus as defined in claim 6, wherein said image-forming means further comprises an electronic viewfinder for displaying on its screen the same images as are being recorded.

8. An apparatus as defined in claim 5, wherein said signal generating means is comprised of a photointerrupter and a disk securely mounted on a shaft of a motor by which said rotary shutter is rotated, said disk being provided with a plurality of radial slits which said interrupter detects to provide pulse signals whose pulse duration is constant.

9. An apparatus as defined in claim 5, wherein said image-forming means comprises at least a magnetic recording head and a recording circuit for controlling said magnetic recording head to record images based on said photoelectric output signal from said image-sensing means.

10. In an image pickup apparatus with a rotary shutter having sector blades disposed in the optical path of image light traveling to an image-sensing means to define the amount of time the image-forming light strikes the image-sensing means, said image-sensing means being comprised of a large number of photoelectric conversion elements for converting light into electric charges, and means for scanning said image-sensing means with scanning signals including a periodic vertical scanning signal to retrieve from the respective photoelectric conversion elements image signals which in turn are transferred to an image-recording means including a magnetic recording medium; the improvement comprising:

a phase detector for generating a phase pulse with a constant duration whose repetition rate varies as the speed of rotation of said sector blades;

means for detecting a phase difference between said phase pulse and said vertical scanning signal; and a switching circuit controlled by said detecting means that is rendered conductive when said detecting means detects no said phase difference, said switching circuit being disposed between said image sensing means and image recording means so as to permit the transfer of said image signals therebetween when said switching circuit is conductive.

11. An apparatus as defined in claim 10 wherein said switching circuit is connected between a power source for supplying operating voltage to said image recording means and a power source for supplying operating voltage to at least said image recording means so as to permit the image recording means to be operable when said switching circuit is conductive.

* * * * *